April 1, 1952      L. A. BECKER      2,590,919
CLOTHESLINE ADJUSTER
Filed March 17, 1948
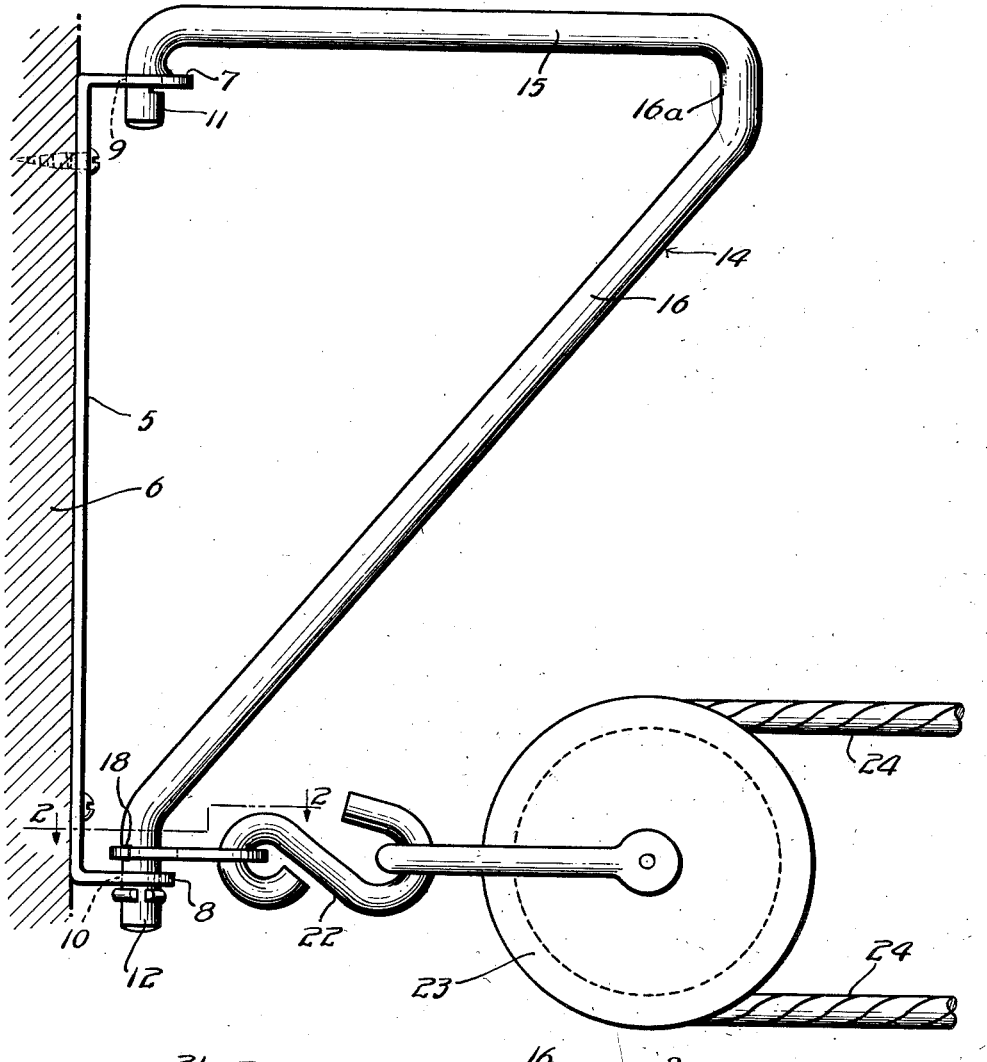
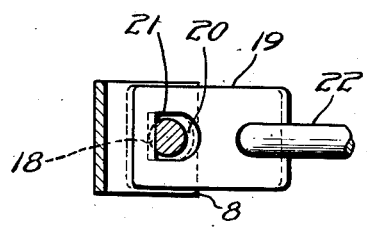
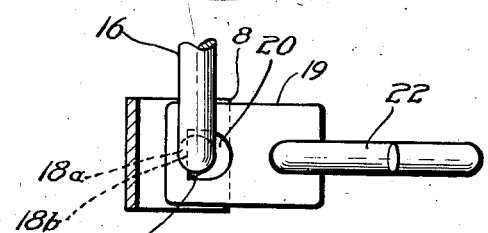
Inventor
LAWRENCE A. BECKER
By H. M. Kilpatrick
Attorney Patented Apr. 1, 1952

2,590,919

UNITED STATES PATENT OFFICE 2,590,919

CLOTHESLINE ADJUSTER

Lawrence A. Becker, Marble Hill, N. Y.

Application March 17, 1948, Serial No. 15,341

7 Claims. (Cl. 211—119.17)

This invention relates to take-up devices and to means for adjustably supporting pulley lines and more particularly to devices for adjustably supporting pulley carried clothes lines though it is noted that in some of the broader claims the invention is not limited to pulley line supports.

Objects of the invention are to provide an improved pulley line support and take-up device of this kind for allowing for the shortening of the line from shrinkage when it becomes wet, and allowing easy attachment to the outside of a window facing and allowing for easy manipulation in use.

Other objects of the invention are to provide an improved device of this kind which is light in weight, occupies small space when in use or shipping, automatically adjusts to the direction of the pulley pull, and affords leverage when being manipulated for tightening the line.

Additional objects of the invention are to effect simplicity and efficiency in such devices and to provide an extremely simple device of this kind which is convenient, durable, and reliable in operation, economical to manufacture, and easy to install.

Still other objects of the invention will appear as the description proceeds; and while herein details of the invention are described in the specification and some of the claims, the invention as described in the broader claims is not limited to these, and many and various changes may be made without departing from the scope of the invention as claimed in the broader claims.

The inventive features for the accomplishment of these and other objects are shown herein in connection with an improved pulley support and adjuster which briefly stated, includes a bent rod having down-turned upper and lower end parts, a horizontal part joining the upper end part, and a diagonal part extending from the outer end of the horizontal part to said lower end part. Mounting means adapted to be mounted on a window facing to pivotally receive upper and lower ends.

Said lower end part is of round cross section and just above its mounting means has a deep transverse slot at or near the side most remote from the diagonal part. A shackle plate having an elongated opening slidably received on said rod has a transverse inner end edge engageable in said transverse slot; and means for attaching a pulley is provided on the shackle plate facing and remote from said inner edge.

In the accompanying drawing showing, by way of example, two of many possible embodiments of the invention:

Fig. 1 is a side elevation showing the pulley and a portion of the line, and holder in position of use;

Fig. 2 is a section taken on the line 2—2 of Fig. 1 showing the shackle plate in plan; and Fig. 3 is a section similar to Fig. 2, but showing a modification with the shackle receiving slot in a different position.

My improved clothes line support and adjuster comprises a strip of metal 5 adapted to be vertically secured flat on the outside of a window facing 6, and having outturned ends 7, 8 and upper and lower round openings 9, 10 therein in which are pivotally received upper and lower downturned end parts 11, 12 of a holder 14, consisting of a bent rod of round cross-section having a horizontal part 15 joining the upper end part 11, a short vertical part 16a joining the outer end of the horizontal part, and a diagonal part 16 extending from the lower end of the vertical part 16a to the upper of said lower end part 12.

Said lower end part 12 just above said lower opening 10 has a deep transverse slot or notch 18 on the side most remote from the outer part of the diagonal part 16, and an elongated shackle plate 19 on said rod has at its inner end a large longitudinal opening 20 received on said rod, the opening having at its inner end near the inner end of the plate a transverse straight edge 21, the other end of this opening being more remote from the inner end of the plate.

A hook 22 is linked on the outer end of the shackle plate, to which hook may be attached the pulley 23 of a clothes line 24 extended to and distant around a distant companion pulley (not shown) on a pole remote from the window. Said straight edge 21 of the shackle plate opening is engaged in said transverse slot 18 when the clothes line is taut and in use, when said horizontal part 16 points toward the distant pulley.

Said holder 14 is turnable in the round openings 9, 10 to become disposed at a right angle to the clothes line, to bring a round part of said lower end part 12 of the rod against the said straight edge 21, thereby to allow the shackle plate, when the line is not in use, to be easily slid up to the vertical part 16a, to allow slack in the line to allow for shrinking of the line should the line get wet.

When the shackle plate is at the upper and outer part of the diagonal part 16 or the vertical part 16a said parts form a convenient lever for pulling the holder toward a position in a plane at a right angle to the line, whereupon the shackle plate may be slid down to the lower end part, to pass into the slot 18 when the holder is turned to point toward the line.

It is noted that the holder 14 is turnable to allow it to point toward the distant pulley, even if the distant pulley should be not opposite the window.

When the line is not in use, the holder is disposed toward the line and the shackle plate 19 is at the vertical part 16a, to allow the line to be slack to allow for shrinking if the line should get wet.

When the line is to be used the shackle plate is disposed in the notch 18 as will be explained. If the line is quite slack, it is merely necessary to slide the shackle plate 19 down until it catches in the notch 18. If the line is very taut, the shackle plate may be moved partly down on the diagonal part 16, the parts 15, 16 being then pulled toward the user, these parts serving as levers to pull the shackle plate toward the user until the horizontal part 16 is at a right angle to the line and the line is stretched, whereupon the shackle plate may be slid down as far as the slot 18, after which the holder may be turned toward the line to cause the slot 18 to move to the edge 21, to allow the edge 21 to move into the slot 18, after which the line is ready for use.

If desired, the slot 18 instead of being on the side of the end part 12 most remote from the diagonal part, may be placed as in the notch 18a with its inner wall 18b parallel to the plane of the holder, as in Fig. 3. This allows the holder 14 when the plate is in the slot and the line is in use to be placed in a direction away from the user at a right angle to the line, thus to be entirely out of the way of the user when putting clothes on the line.

I claim as my invention:

1. A clothes line adjuster comprising a bent rod having alined upper and lower end parts, a substantially horizontal part joining the upper end part, and a diagonal part extending substantially from the outer end of the horizontal part to said lower end part; mounting means pivotally receiving said end parts; said lower end part extending downwardly being of round cross section and having in its side just above its mounting means a deep transverse slot remote from the diagonal part; a shackle plate having an elongated opening received on said rod and having a transverse substantially straight inner end edge engageable in said transverse slot; and means for attaching a pulley on the shackle plate remote from and facing said inner edge.

2. A clothes line adjuster comprising a holder; a mounting means pivotally mounting said holder for pivotal movement substantially on a pivot axis; said holder having a diagonal part diagonal to said axis, and a substantially axial part joining the diagonal part and having a transverse slot in a part remote from the diagonal part; and a shackle sliding on said parts and having an edge engageable in said slot.

3. A clothes line adjuster comprising a holder having axially alined end parts and a pair of outwardly extending parts joining said end parts respectively and substantially joining each other at the outer ends, one of said extending parts being a diagonal part; mounting means pivotally receiving said end parts; the end part joining the diagonal part having between the diagonal part and its mounting means a deep transverse slot remote from the diagonal part; a shackle plate having an elongated opening received on said diagonal part and the adjacent end part, said opening having at its inner end a transverse straight edge engageable in said transverse slot; and means for attaching a pulley to the shackle plate remote from said edge.

4. A clothes line adjuster comprising a bent rod having down-turned upper and lower end parts, a horizontal part joining the upper end part, and a diagonal part extending substantially from the outer end of the horizontal part to said lower end part; mounting means pivotally receiving said end parts; said lower end part being of round cross section and just above its mounting means having a deep transverse slot on the side remote from the diagonal part; a shackle plate having an elongated opening received on said rod and having a transverse straight inner end edge engageable in said transverse slot; a means for attaching a pulley on the shackle plate facing and remote from said inner edge.

5. A clothes line adjuster comprising a strip of metal adapted to be vertically secured flat on the outside of a window facing, and having out-turned ends having round openings therein; a holder comprising a bent rod of round cross section having downturned end parts pivotally received in said openings respectively, a horizontal part joining the upper end part, a short vertical part joining the outer end of the horizontal part, and a diagonal part extending downwardly from the lower end of the vertical part to the upper part of said lower end part, said lower end part just above said opening having a deep transverse slot on the side most remote from the outer part of the diagonal part; an elongated shackle plate having at its inner end a large longitudinal opening received on said rod and having a transverse straight edge at its inner end; a hook linked on the outer end of the shackle plate.

6. A clothes line adjuster comprising a holder having alined upper and lower end parts, a substantially horizontal part joining the upper end part, and a diagonal part extending substantially from the outer end of the horizontal part to said lower end part; mounting means pivotally receiving said end parts; said lower end part extending downwardly and having a vertical part just above its mounting means; a shackle plate having an opening slidably received on said diagonal and vertical parts and slidable from one to the other; and means on the shackle plate, to which may be attached the pulley of a clothes line horizontally extended to a point remote from the holder; the holder being turnable to allow it to point toward said point to allow the shackle plate when on the lower part of the diagonal part to easily slide up, aided by the tension of the line to the upper end of the diagonal part or intermediately of the diagonal part, in which position the horizontal and diagonal parts form a convenient lever for pulling the holder to a position at a right angle to the line or to a position more remote from the line to facilitate lowering the shackle plate to said vertical part, where the horizontally extended line would tend to hold it.

7. A clothes line adjuster comprising a strip of metal adapted to be vertically secured flat on the outside of a window facing, and having out-turned ends having round openings therein; a holder comprising a bent rod of round cross-section having downturned end parts pivotally received in said openings respectively, a horizontal part joining the upper end of the upper end part, and a diagonal part extending from the outer end of the horizontal part to the upper part of said lower end part; said lower end part having a vertical part between the adjacent opening and the diagonal part; an elongated shackle plate having at its inner end an opening received on said rod; means on the outer end of the shackle plate, to which may be attached the pulley of a clothes line horizontally extended to a point remote from the window; the holder being turnable toward said point to allow the shackle plate when on the lower part of the diagonal part to easily slide up, aided by the tension of the line, to the upper end of the diagonal part or intermediately of the diagonal part, in which position the horizontal and diagonal parts form a convenient lever for pulling the holder to a position at a right angle to the line or to a position more remote from the line to facilitate lowering the shackle plate to said vertical part, where the horizontally extended line would tend to hold it.

LAWRENCE A. BECKER.

REFERENCES CITED

The following references are of record in the file of this patent:

UNITED STATES PATENTS

| Number | Name | Date |
|---|---|---|
| 201,823 | Oaks | Mar. 26, 1878 |
| 498,080 | Oppenheimer | May 23, 1893 |
| 686,799 | Barnes | Nov. 19, 1901 |
| 881,784 | Fitts | Mar. 10, 1908 |
| 893,917 | Gassett | July 21, 1908 |
| 939,811 | Culbertson | Nov. 9, 1909 |
| 984,604 | Rantine | Feb. 21, 1911 |
| 1,002,402 | Horwitz | Sept. 5, 1911 |
| 1,052,819 | Herstein | Feb. 11, 1913 |
| 1,081,440 | Erickson | Dec. 16, 1913 |
| 1,096,448 | Murphey et al. | May 12, 1914 |
| 1,275,358 | Backoff | Aug. 13, 1918 |
| 2,265,017 | Winkle | Dec. 2, 1941 |